(12) United States Patent
Kloos et al.

(10) Patent No.: US 10,122,571 B2
(45) Date of Patent: Nov. 6, 2018

(54) AUTOCLASSIFICATION OF NETWORK INTERFACES BASED ON NAME

(71) Applicant: Arbor Networks, Inc., Burlington, MA (US)

(72) Inventors: Michael Kloos, Erlenbach (DE); Thomas Sundstrom, Enkoping (SE)

(73) Assignee: Arbor Networks, Inc., Burlington, MA (US)

(*) Notice: Subject to any disclaimer, the term of this patent is extended or adjusted under 35 U.S.C. 154(b) by 184 days.

(21) Appl. No.: 15/191,237

(22) Filed: Jun. 23, 2016

(65) Prior Publication Data

US 2017/0373922 A1    Dec. 28, 2017

(51) Int. Cl.
*H04L 12/24* (2006.01)
*H04L 29/08* (2006.01)
*G06F 17/30* (2006.01)

(52) U.S. Cl.
CPC ...... *H04L 41/046* (2013.01); *G06F 17/30985* (2013.01); *H04L 41/0893* (2013.01); *H04L 41/20* (2013.01); *H04L 67/10* (2013.01)

(58) Field of Classification Search
CPC .................................................. H04L 41/046
USPC ................................................. 709/202
See application file for complete search history.

(56) References Cited

U.S. PATENT DOCUMENTS

2004/0107276 A1* 6/2004 Mo .............. H04L 41/024
709/223

* cited by examiner

*Primary Examiner* — Adnan Mirza
(74) *Attorney, Agent, or Firm* — Locke Lord LLP; Scott D. Wofsy; Christopher J. Capelli

(57) ABSTRACT

A network management system is provided in which a processing device coupled to a network performs operations to identify an interface accordance with a rule and associate the identified interface with a category in accordance with the rule. The interface is coupled between a managed device and the network. The rule is based on a name associated with the interface, wherein the name indicates semantic information about data transmitted via the interface. Upon detection of transmission of data via the interface, the processor further performs operations to determine an action associated with the category and apply the action to the data.

17 Claims, 6 Drawing Sheets

AUTOCLASSIFICATION OF NETWORK INTERFACES BASED ON NAME

FIELD OF THE INVENTION

The disclosed embodiments generally relate to network interfaces, and more particularly, to auto classification of network interfaces based on a name associated with the interface.

BACKGROUND OF THE INVENTION

Network devices that interface to a network can be managed by a network-management system (NMS) for managing processing and memory resources of the network. The network devices can be provided with a simple network management protocol (SNMP) software agent that communicates with the NMS, such as using SNMP protocol.

One task performed by the NMS is to manage interfaces of the network device that are coupled to the network, such as to assign a classification to an interface based on an SNMP description of the interface. The SNMP description, which is stored by the network device, includes default or user-generated text. Other than when the SNMP description is manually set by the user, the SNMP description is static during operation of the network device.

The NMS can apply rules to an interface of a network device to categorize the interface based on content of the SNMP description. A selected task can then be performed to data associated with interfaces that belong to a particular category. However, since the SNMP description is manually assigned and static during operation of the network device, the SNMP description includes limited data that can be used to categorize the interface. Additional information associated with the interface of the network device that may be generated automatically or in real time is inaccessible to the NMS for the purpose of categorizing the interface. For example, information associated with the interface that is generated in response to creation of a dynamic interface is not included in the SNMP description and is not accessible to the NMS.

Such conventional methods and systems have generally been considered satisfactory for their intended purpose. However, there is a need in the art for a system and method in which the NMS can use dynamic information created or updated during operation of a network device to categorize an interface of the network device for processing data entering or exiting the interface based on such categorization. The present disclosure provides a solution for these problems.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a network management system is described in which a processing device coupled to a network performs operations to identify an interface accordance with a rule and associate the identified interface with a category in accordance with the rule. The interface is coupled between a managed device and the network. The rule is based on a name associated with the interface, wherein the name indicates semantic information about data transmitted via the interface. Upon detection of transmission of data via the interface, the processor further performs operations to determine an action associated with the category and apply the action to the data.

In further aspects, a method of managing a network managed device is provided. The method includes identifying an interface in accordance with a rule, wherein the interface is coupled between a managed device and the network. The rule is based on a name associated with the interface. The name indicates semantic information about data transmitted via the interface. The method further includes associating the identified interface with a category in accordance with the rule, and upon detection of transmission of data via the interface, determining an action associated with the category. The method further includes applying the action to the data.

In still further aspects, a non-transitory computer readable storage medium is provided that stores programmable instructions, which when executed by a computer system cause the computer system to perform operations of the method.

BRIEF DESCRIPTION OF THE DRAWINGS

The accompanying appendices and/or drawings illustrate various non-limiting example, inventive aspects in accordance with the present disclosure.

DETAILED DESCRIPTION OF CERTAIN EMBODIMENTS

Figure 1:
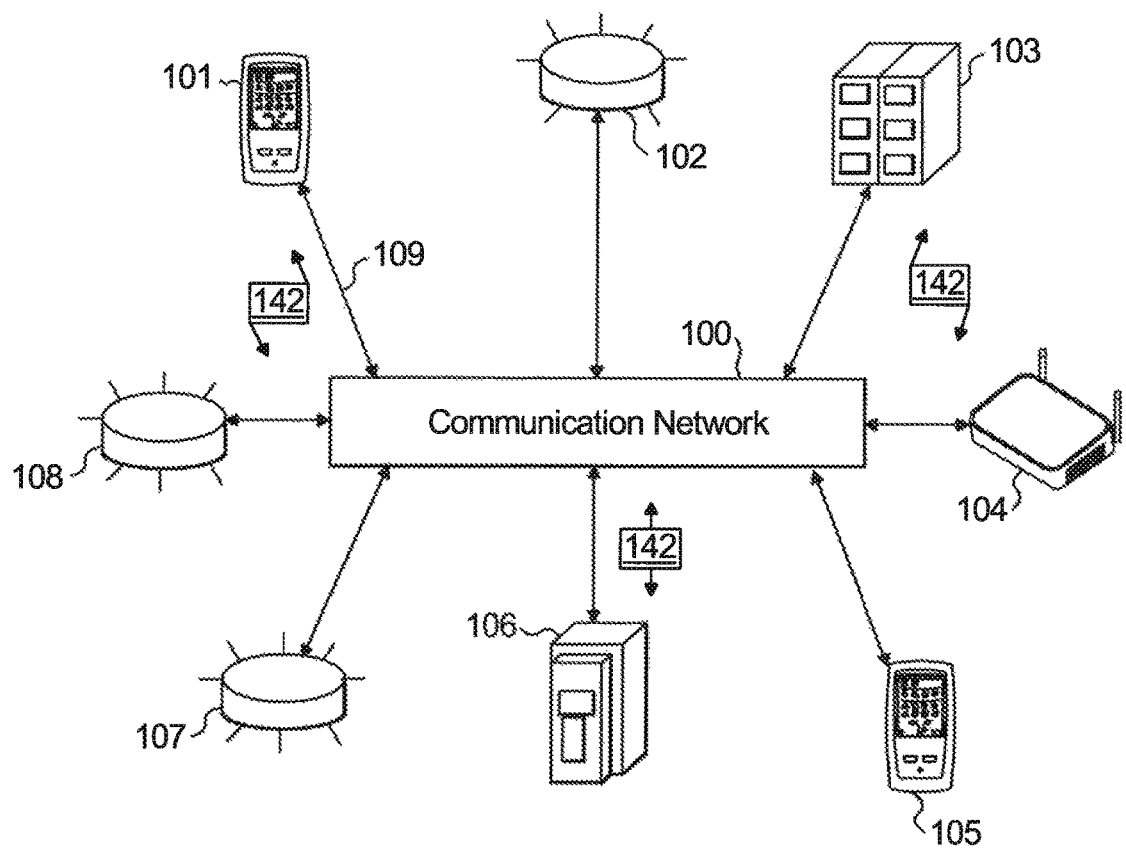
FIG. 1 illustrates an example communication network.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), synchronous digital hierarchy (SDH) links, or Power line Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
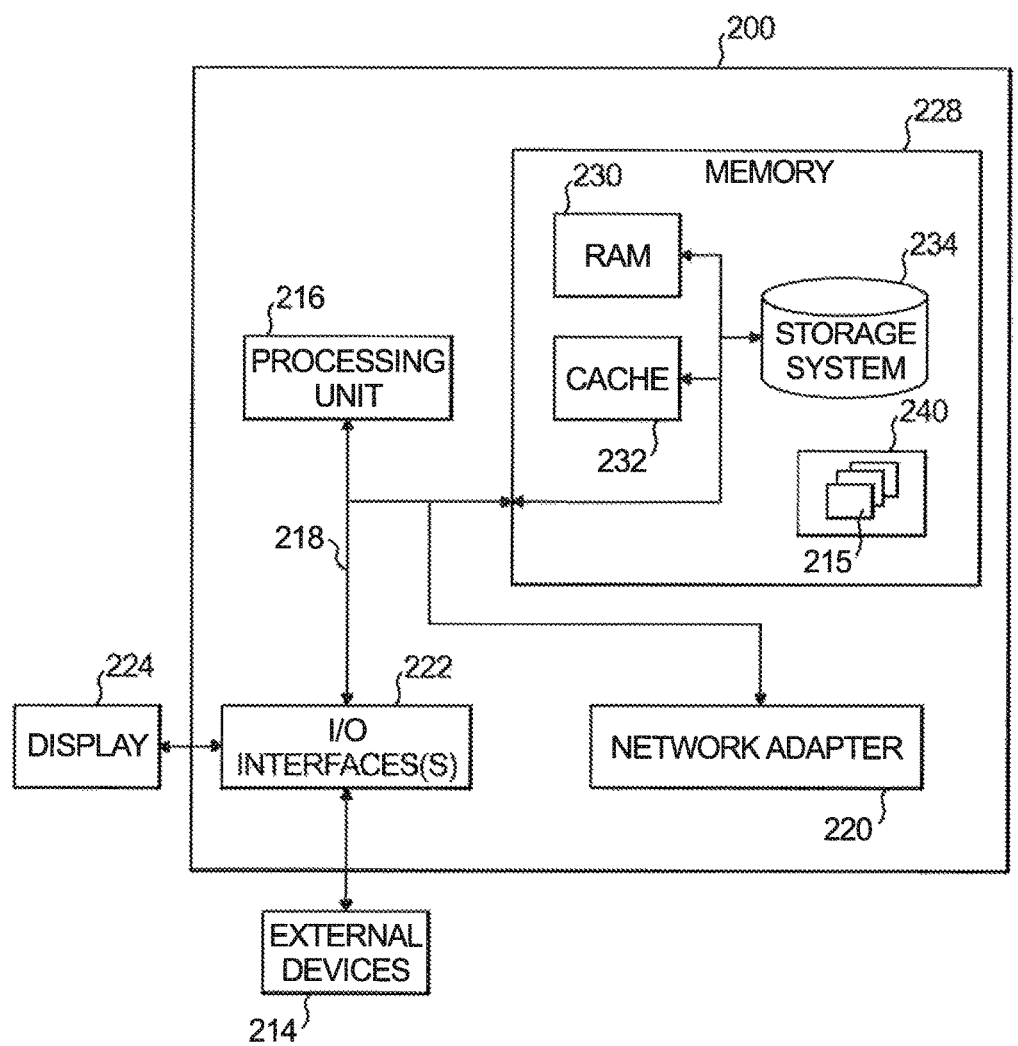
FIG. 2 illustrates an example network device/node.
Figure 3:
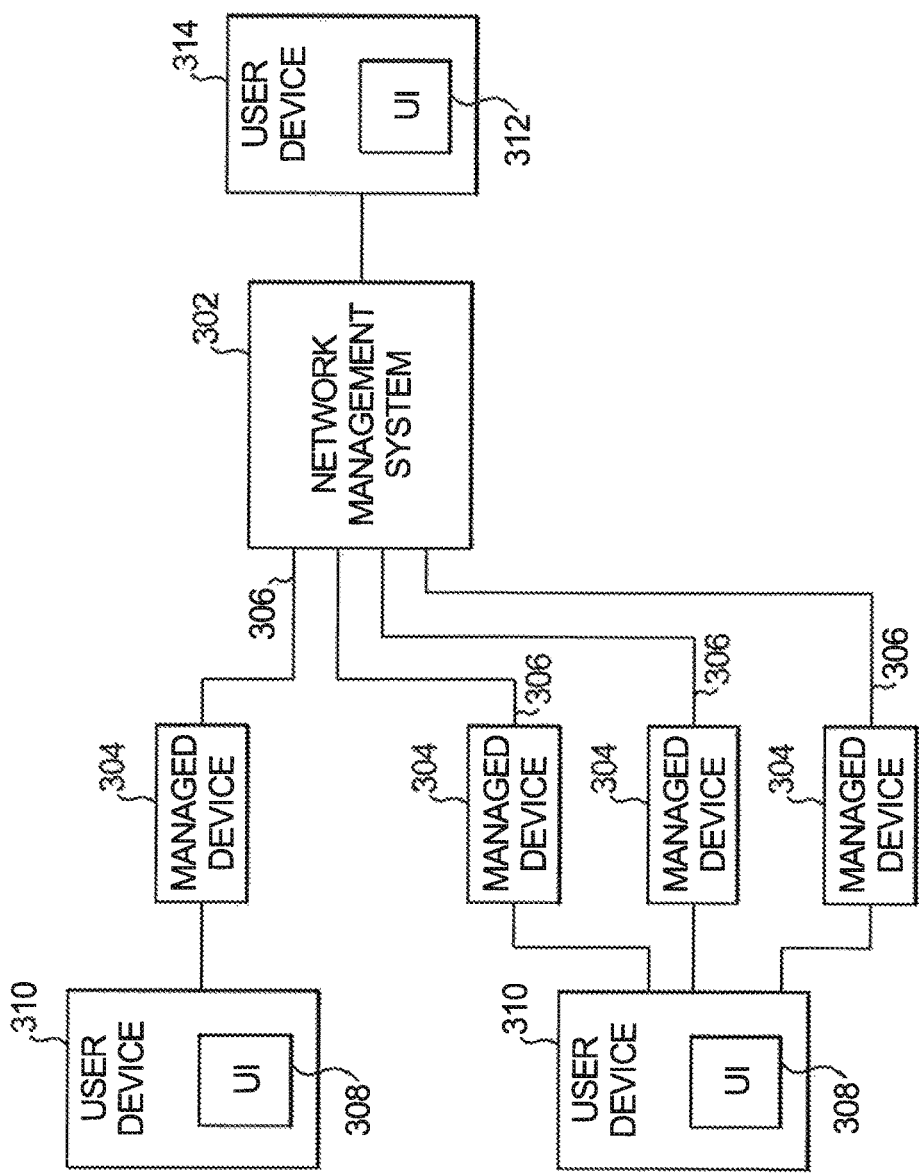
FIG. 3 illustrates a block diagram of a network having a managed network devices and a network management system in accordance with the present disclosure.

FIG. 2 is a schematic block diagram of an example network computing device 200 (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present disclosure. Device 200 is only one example of a suitable system and is not intended to suggest any limitation as to the scope of use or functionality of embodiments of the disclosure described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, smart devices, tablets, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the disclosure.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the disclosure as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

In the description that follows, certain embodiments may be described with reference to acts and symbolic representations of operations that are performed by one or more computing devices, such as the computing system environment 200 of FIG. 2. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIGS. 1 and 2 are intended to provide a brief, general description of an illustrative and/or suitable exemplary environment in which embodiments of the below described present disclosure may be implemented. FIGS. 1 and 2 are exemplary of a suitable environment and are not intended to suggest any limitation as to the structure, scope of use, or functionality of an embodiment of the present disclosure. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

With the exemplary communication network 100 (FIG. 1) and computing device 200 (FIG. 2) being generally shown and discussed above, description of certain illustrated embodiments of the present disclosure will now be provided. With reference now to FIGS. 3-7, an example network 300 is shown, wherein the network 300 includes a network management system (NMS) 302 and a plurality of network managed devices 304 that can communicate with the NMS 302 via communication links 306. The communication links 306 can include wired and/or wireless links. The managed devices 304 can be configurable by a user operating a user interface (UI) 308 that can be integrated with the managed device 304 or with a user device 310 coupled to the managed device 304. Similarly, the NMS 302 can be configurable by a user operating a user interface 312 that can be integrated with the NMS 302 or with a user device 314 coupled to the NMS 302. User interfaces 308 and 312 can include, for example, a graphical user interface (GUI), user entry device (e.g., a keyboard or touch screen), and a display device (not shown). User devices 312 and 314 can be configured, for example, as a mobile device (e.g., a smart phone, tablet, laptop), desktop computer, or computer terminal.

Figure 4:
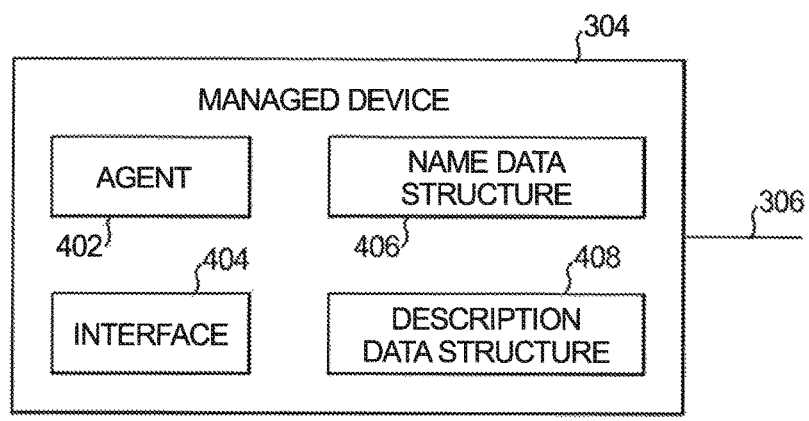
FIG. 4 illustrates a block diagram of a managed device shown in FIG. 3.

FIG. 4 shows a block diagram of an example managed device 304. The managed device 304 can be configured similarly to the network computing device 200 of FIG. 2. The managed device 304 can be, for example and without limitation, a router, access server, switch, bridge, hub, computer host, or printer. The managed device 304 includes an agent 402 and one or more interfaces 404.

The agent 402 is a software agent that includes programmable instructions executable by a processing device of the managed device 304, including a virtual or physical processing device. The processing device can be, for example, configured similarly to processing unit 216 of FIG. 2. In an embodiment, the agent 402 is a simple network management protocol (SNMP) agent. The agent 402 can be stored by a storage device that is included with or can be accessed by the managed device 304. The storage device can be included in a memory that is configured similarly to storage system 234 of FIG. 2. The agent 402 and the network management system 302 communicate using a predetermined network management protocol, such as SNMP, application program interface (API) calls, curls scripts™ or the equivalent. The agent 402 can respond to the requests or instructions communicated to the agent 402 by the NMS 302.

The agent 402 can be generated and loaded to the managing device 304 using agent development software via the user interface 310 of the user device 308, e.g., SNMP agent development software. Alternatively, the user interface 314 of the user device 312 can similarly be used to generate and load the agent 402 to the managed device 304 by transmitting the agent 406 from the NMS 302 to the managed device 304 via communication link 306, with instructions to upload the agent 402 to the managed device 304.

The interface 404 can include one or more physical or dynamic interfaces that interface the managed device 304 to the associated communication link 306 or directly to another network device coupled to the network 100 for facilitating communication between the managed device 304 and other devices coupled to the network.

For example, a user device 310 can be a subscriber to a network that accesses the network via a physical access device, such as a digital subscriber line (DSL), leased line, fiber, routers, or cable modem. The term subscriber refers to a device that is registered with the network or a device operated by a user, customer, or corporation that is registered with the network in accordance with a subscription. Multiple user devices 310 can be connected via respective physical access devices traversing an access network to an aggregation device, such as a Multi Service Access Node (MSAN).

The aggregation device can be installed, for example, in a telephone exchange, ISP POP or a roadside serving area interface cabinet. The aggregation device can transport network traffic from the physical access device to a broadband remote access server (BRAS) device via an interface, such as interface 404.

The access node (MSAN) terminates the physical connection. Multiple logical links or transport protocol links can be dynamically established using interface 404 on the managed device 304, e.g., using Multiprotocol Label Switching (MPLS) or virtual LAN (VLAN) tagging using IEEE 802.1Q. For example, when multiple subscribers request use of a physical interface named eth1 that terminates at the MSAN, dynamic interfaces can be created named, for example eth1.1, eth1.2, etc.

Interface 404 can include, for example a network interface card that supports a network communication protocol, such as Ethernet. The interface 404 can support protocols, such as and without limitation, Ethernet, Fast Ethernet, gigabit Ethernet (GE) (e.g., 1GE 10GE). The aggregation device is not limited to an MSAN, and the interface 404 is not limited a particular type, as those skilled in the art will readily appreciate that other types of aggregation devices or interfaces can be used.

The BRAS device can be included with an Internet, mobile, or hosting service provider (ISP) network that facilitates the convergence of multiple Internet traffic sources and aggregates the network traffic. The BRAS device can terminate or anchor subscriber sessions and provide access to network services. A session can be an interactive information interchange (also known as a dialogue, conversation or meeting) between two or more communicating devices. The communicating devices can be, for example, home-based subscribers, mobile subscribers, corporate subscribers, etc. The establishment of dynamic interfaces is a first service which can then be associated with a second service, such as VPN or other service that provides access to, for example, Internet, video on demand (VOD), voice over internet protocol (VOIP), etc.

In order to provide dynamic subscriber management, the BRAS device can communicate with an authentication, authorization and accounting (AAA) server, such as a Remote Authentication Dial-In User Service (RADIUS) server to authenticate and authorize usage and provide accounting services. The AAA server can specify subscriber-specific parameters, such as bandwidth speed, quality of service (QoS), etc., associated with the subscriber's service plan. The BRAS device can use dynamic virtual local area network (VLAN) interfaces and dynamic IP profiles to provide a subscriber with use of a specific service via interface 404 associated with the subscriber's service profile, as determined by the AAA server. The interfaces 404 are thus dynamic for allowing a user device 310 operated by a subscriber to access services specific to that subscriber.

The managed device 304 stores a name and/or a description in association with respective interfaces 404 of the managed device 304. The name and description can be an SNMP name and description, respectively. A name is dynamic and can change when communication is established with a network, whereas the description is static. What is more, the name and description can include different information. Each name is stored in name data structure 406 and each description is stored in the description data structure 408.

The description is associated with an interface 404 that is a physical interface. The agent 402 can automatically generate the description based on configuration, instructions, and mapping of the agent 402, or the description can be manually configured.

When an interface 404 is static, the name, like the description, is associated with the physical interface 404 and remains static during operation of the network 300. Although the name can be manually reconfigured, once it is changed manually, the name remains static.

However, interface 404 can include a dynamic interface such as with mobile devices or terminated/restarted establishment of communication with network 100. Such creation of a dynamic interface of interface 404 can occur, for example, each time that a user reboots the managed device 304 or when a new customer and his services are provisioned on one or several service profiles. Each time the managed device 304 establishes communication with the network 100, e.g., with an Internet, mobile or hosting service provider, a dynamic interface of interface 404 can be created. Each time that a dynamic interface of interface 404 is created, the agent 402 automatically associates a new name with the newly created dynamic interface.

The new name can be generated to include semantic information about the dynamic interface of interface 404 it is being associated with, based on configuration of the agent 402. Examples of semantic information that can be included in the name include a class, such as business or personal, a dmux or tun interface specification used by the BRAS (e.g., dmux0.1004 or tun0.321, etc.) associated with a customer with which the dynamic interface is communicating.

Figure 5:
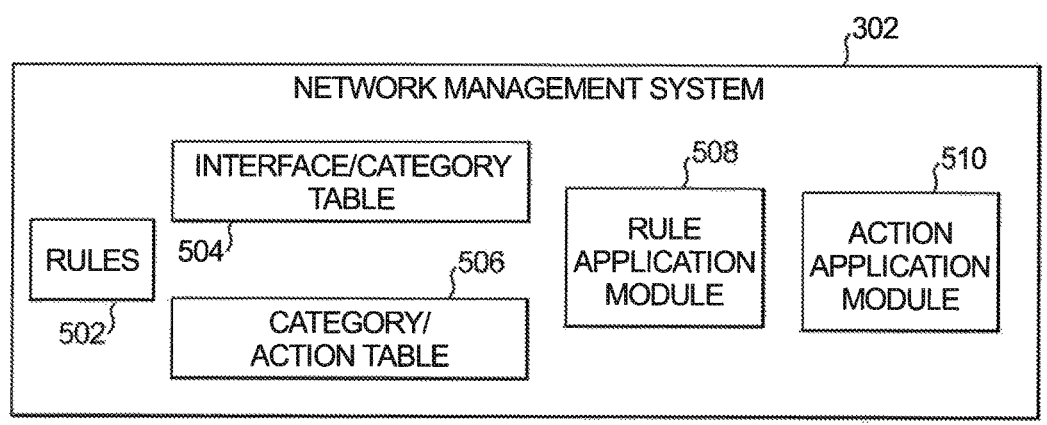
FIG. 5 illustrates a block diagram of a network management system shown in FIG. 3.

FIG. 5 shows a block diagram of an example NMS 302. The NMS 302, which can be configured similarly to the network computing device 200 of FIG. 2, can be, for example, a mobile or stationary computing device, such as a personal computer, a computer server, a laptop computer, or a smart phone. Additionally, the NMS 302 includes a rules data structure 502, an interface/category table 504, a category/action table 506, a rule application module 508, and an action application module 510.

The rules data structure 502 stores one or more rules. Each rule includes a matching condition and a conditional category application that is applied if the matching condition is satisfied. In an embodiment, the rules can be regular expressions (regex). As known to one skilled in the art, a regular expression includes a sequence of characters that define a search pattern, mainly for use in pattern matching with strings, or string matching. The rules can be created and entered by a user, e.g., via user interface 312.

The matching condition identifies all names, or names and descriptions, that include one or more terms (e.g., in a particular field) that match one or more rule terms provided by the rule. For example, the matching condition can identify all names that have a term in a "customer class" field, that match the rule term "personal." The conditional category application can associate each description or name identified to a particular category, such as a category labeled "personal customers" or labeled based on the network service being provided, such as "Internet Access," "corporate virtual private network (VPN)," "voice," "internet protocol television (IPTV)," and "video on demand," etc.

The interface/category table 304 associates interfaces 404 of managed devices 304 that are coupled to the NMS 302 with respective categories assigned based on application of the rules stored in the rules data structure 502.

The rule application module 508 applies the rules by processing interfaces associated with the managed devices 304 the NMS 302 is managing and updates the interface/category table 304 with association of a category to an interface 404. For example, the rule application module 508 can apply the rules to interfaces 404 of all of the managed devices 304 or of a selected subset of the managed devices 304. The rule application module 508 can perform rule application to the interfaces 404 upon occurrence of a condition during operation of the network such as detection of an event or at regular intervals (e.g., every 15 minutes, every 4 hours, or daily). An event that may trigger rule application by the rule application module 508 includes detection of addition of an interface 404, detection of removal of an interface 404, or detection of another related event.

The categories action table 506 associates categories to respective actions. The action application module 510 processes data (e.g., data packets) transmitted to or from the associated managed device 304 via an interface 404, determines a category associated with the interface 404 by consulting the interface/category table 504, and determines an action associated with the category determined by consulting the category/action table 506. The action application module 510 then applies the action determined to the data, such as to associate the classified interfaces as external, internal, backbone, or, dynamic aggregated. Applying the action can include performing the action on the data and/or sending instructions to a network device to perform the action on the data.

Figure 6:
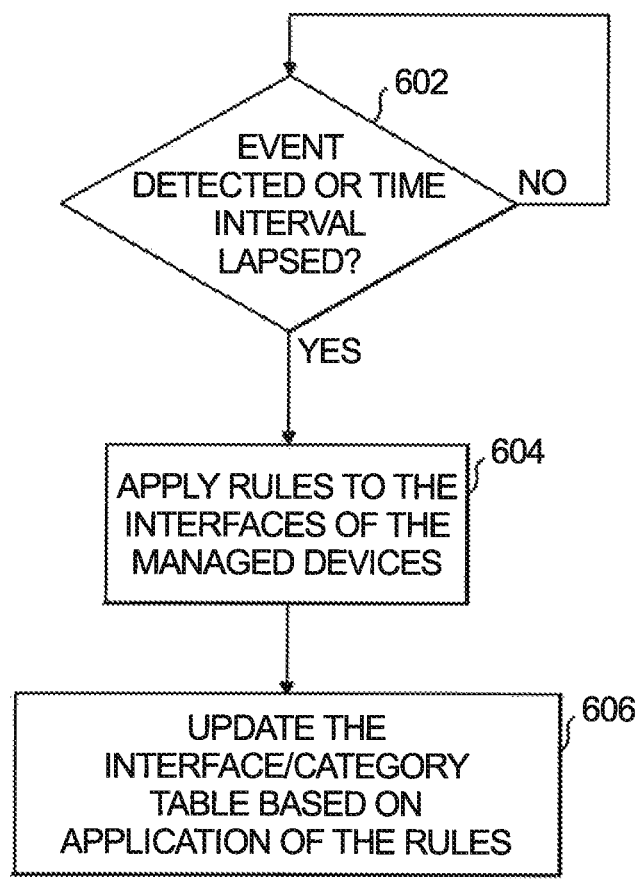
FIG. 6 illustrates a flowchart of operations performed by the network management system shown in FIG. 5
Figure 7:
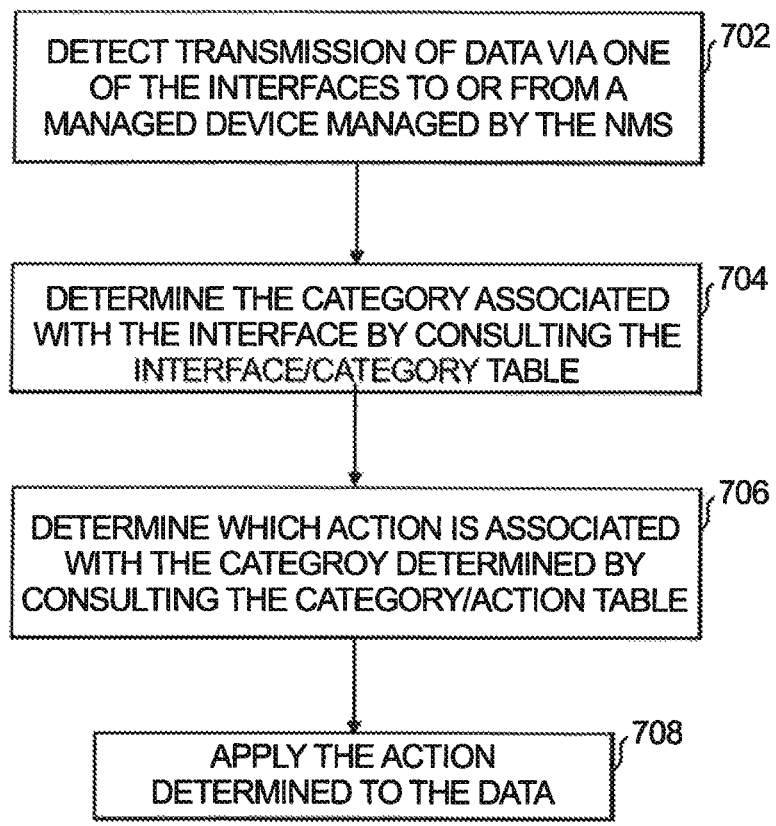
FIG. 7 illustrates a flowchart of operations performed by the action application module shown in FIG. 5.

With reference now to FIGS. 6 and 7, shown are flowcharts demonstrating operation of NMS 302 implementations of the various exemplary embodiments. It is noted that the order of steps shown in FIGS. 6 and 7 is not required, so in principle, the various steps may be performed out of the illustrated order. Also certain steps may be skipped, different steps may be added or substituted, or selected steps or groups of steps may be performed in a separate application following the embodiments described herein.

FIG. 6 shows an example method of operation of the rule application module 508. At operation 602, a determination is made whether an event has been detected or a time interval has lapsed. If NO, operation 602 can be repeated until the determination is YES. When the determination of operation 602 is YES, at operation 604 rules are applied to the interfaces 404 of the managed devices 304. The rules applied at operation 604 can be applied to selected interfaces 404 or interfaces 404 of selected managed devices 302. The selection of the interfaces 404 or the managed devices 302 can be based on the event that was detected at operation 602. At operation 606, the interface/category table 504 is updated to reflect addition or removal of an interface 404 or association of a new category with an interface 404 due to application of the rules at operation 604. The method can continue at operation 602.

FIG. 7 shows an example operation of the action application module 510. At operation 702, transmission of data via one of the interfaces 404 to or from a managed device 304 managed by the NMS 302 is detected. At operation 704, the category associated with the interface 404 is determined by consulting the interface/category table 504. At operation 706, a determination is made of an action associated with the category determined by consulting the category/action table 506. At operation 708, the action determined is applied to the data.

In accordance with the disclosure, the category associated with an interface 404 is determined using the name or name and description associated with the interface 404. Since the name includes semantic information about dynamic interfaces of interface 404 created during operation of the network, the category can be determined based on such semantic information. Additionally, the category can be updated periodically or on establishment of a new dynamic interface of interface 404. Actions applied to data received or transmitted via the interface 404 can thus be selected based on the category and in accordance with the semantic information. Thus data that is received or transmitted along an interface 404 that is being used for data associated customers classified as commercial business customers can be treated differently using selected actions than data associated with customers classified as personal customers or network services, such as Internet access, corporate VPN's, voice, IPTV, and video on demand etc.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this disclosure, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A network management system comprising a processing device coupled to a network to perform operations to:
   identify an interface in accordance with a rule using semantic information including a class of device and a dmux or tun interface specification used by a Broadband Remote Access Server (BRAS) associated with a customer with which the interface is in communication with, the interface being coupled between a managed device and the network, the rule being based on a name associated with the interface, the name indicating semantic information about data transmitted via the interface;
   associate the identified interface with a category in accordance with the rule; upon detection of transmission of data via the interface, determine an action associated with the category; and
   apply the action to the data.

2. The network management system of claim 1, wherein the name associated with the interface is a simple network management protocol (SNMP) name.

3. The network management system of claim 2, wherein the rule is further based on an SNMP description.

4. The network management system of claim 2, wherein identifying the interface includes determining whether a string in the SNMP name matches a search string.

5. The network management system of claim 2, wherein the rule is configured as a regular expression that defines a search pattern, the regular expression being configured to determine if the SNMP name includes a string that matches the search pattern.

6. The network management system of claim 5, wherein the SNMP name includes a string indicating a classification of customer communicating with the network via the interface.

7. The network management system of claim 2, wherein the managed device is at least one of a router and a switch.

8. The network management system of claim 2, wherein the interface is a dynamic interface and the SNMP name was automatically assigned to the dynamic interface.

9. The network management system of claim 1, wherein identifying the interface and associating the identified interface are performed in response to a condition, wherein the condition is at least one of configuration of a new SNMP name for the interface during operation of the network, notification of a configuration of a new rule, expiration of a predetermined time interval.

10. A method of managing a network managed device, the method comprising:

identifying an interface in accordance with a rule using semantic information including a class of device and a dmux or tun interface specification used by a Broadband Remote Access Server (BRAS) associated with a customer with which the interface is in communication with, the interface being coupled between a managed device and the network, the rule being based on a name associated with the interface, the name indicating semantic information about data transmitted via the interface;

associating the identified interface with a category in accordance with the rule; upon detection of transmission of data via the interface, determining an action associated with the category; and applying the action to the data.

11. The method of claim 10, wherein the name associated with the interface is a simple network management protocol (SNMP) name.

12. The method of claim 11, wherein the interface is a dynamic interface and the SNMP name was automatically assigned to the dynamic interface.

13. The method of claim 11, wherein identifying the interface and associating the identified interface are performed in response to a condition, wherein the condition is at least one of configuration of a new SNMP name for the interface during operation of the network, notification of a configuration of a new rule, expiration of a predetermined time interval.

14. A non-transitory computer readable storage medium storing programmable instructions, which when executed by a computer system cause the computer system to perform operations to:

identify an interface in accordance with a rule using semantic information including a class of device and a dmux or tun interface specification used by a Broadband Remote Access Server (BRAS) associated with a customer with which the interface is in communication with, the interface being coupled between a managed device and the network, the rule being based on a name associated with the interface, the name indicating semantic information about data transmitted via the interface;

associate the identified interface with a category in accordance with the rule; upon detection of transmission of data via the interface, determine an action associated with the category; and apply the action to the data.

15. The computer readable storage medium claim 14, wherein the name associated with the interface is a simple network management protocol (SNMP) name.

16. The computer readable storage medium of claim 15, wherein the interface is a dynamic interface and the SNMP name was automatically assigned to the dynamic interface.

17. The computer readable storage medium 15, wherein identifying the interface and associating the identified interface are performed in response to a condition, wherein the condition is at least one of configuration of a new SNMP name for the interface during operation of the network, notification of a configuration of a new rule, expiration of a predetermined time interval.

* * * * *